United States Patent [19]
Tsai

[11] Patent Number: 5,887,962
[45] Date of Patent: Mar. 30, 1999

[54] FOOT ADAPTED FOR STABILIZING THE BOTTOM OF A COMPUTER CASE

[76] Inventor: Kun-Ming Tsai, No. 141, Lane 351, Sec. 1, Tai-Ping Rd., Tsao-Tun Chen, Nan-Tou Hsien, Taiwan

[21] Appl. No.: 895,935

[22] Filed: Jul. 17, 1997

[51] Int. Cl.⁶ .................................................. A47B 88/00
[52] U.S. Cl. .................................. 312/351.9; 312/223.2; 248/188.1; 248/677
[58] Field of Search ............................. 312/223.2, 351.6, 312/351.7, 351.5, 351.8, 334.27, 334.44, 351.1, 351.9; 361/394; D14/102; 248/678, 188.1, 188.8, 677

[56] References Cited

U.S. PATENT DOCUMENTS

D. 313,015  12/1990  Ryan et al. ............................ D14/102
5,749,637   5/1998   McMahan et al. ...................... 248/677

FOREIGN PATENT DOCUMENTS

0176907  4/1986  European Pat. Off. ............... 361/394
206847   2/1909  Germany ............................... 312/348

*Primary Examiner*—Peter R. Brown
*Assistant Examiner*—Gerald A. Anderson
*Attorney, Agent, or Firm*—Townsend and Townsend and Crew LLP

[57] ABSTRACT

A foot for stabilizing a case includes a circular mounting plate to be secured to the bottom of the case, and an elongate foot plate which has a longitudinal channel to receive the mounting plate. The foot plate is rotatable about the axis of the mounting plate, and the mounting plate is slidable along the foot plate. Therefore, the angle and position of the foot plate are adjustable relative to the mounting plate for accommodation on the space where the case is located.

1 Claim, 8 Drawing Sheets

FOOT ADAPTED FOR STABILIZING THE BOTTOM OF A COMPUTER CASE

BACKGROUND OF THE INVENTION

1. Field of the Invention

This invention relates to a stabilizing foot, more particularly to a foot which is adapted for stabilizing the bottom of a computer case, the angle and position of the foot being adjustable relative to the computer case.

2. Description of the Related Art

Figure 1:
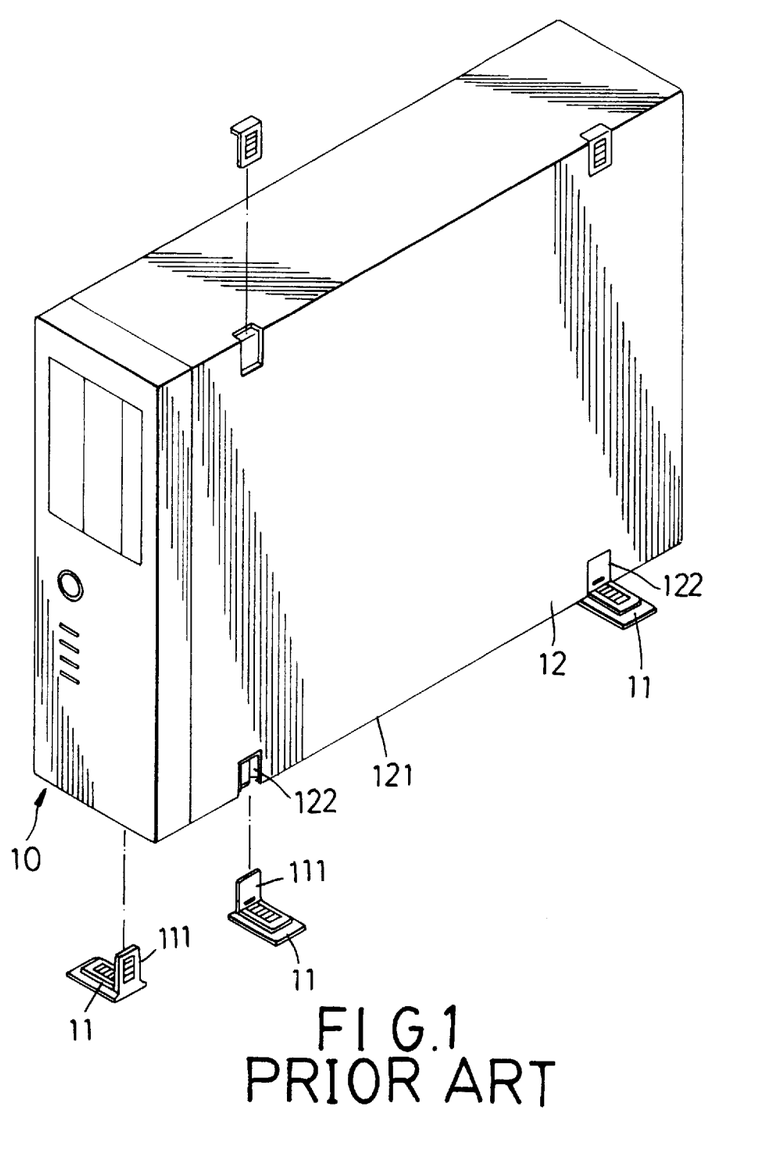
FIG. 1 is a perspective view of a conventional foot of a computer case.
Figure 2:
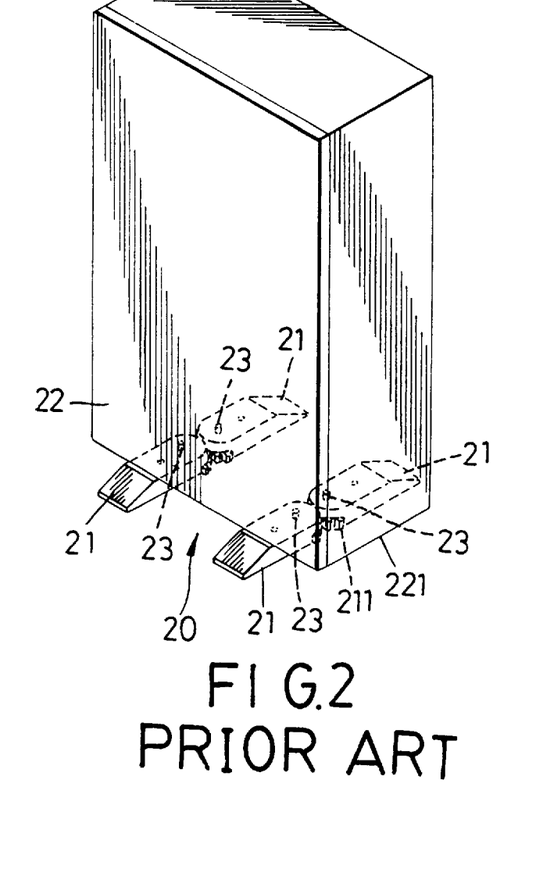
FIG. 2 is a perspective view of another conventional foot of a computer case.

Referring to FIG. 1, a conventional arrangement 10 for stabilizing a computer case 12 is shown to comprise four L-shaped foot plates 11. Upwardly extending portions 111 of the foot plates 11 are inserted into four holes 122 which are formed in the case 12 adjacent to the bottom 121. In use, the foot plates 11 project laterally from the case 12, thereby occupying space at two sides of the case 12. In addition, since the foot plates 11 are not secured to the case 12 in storage, they are separable and easily lost. Referring to FIG. 2, another arrangement 20 for stabilizing a computer case 22 is shown to include two pairs of foot plates 21 which are mounted rotatably to the bottom 221 of the case 22 by pivot pins 23. Each pair of the foot plates 21 have engaging teeth 211 which engage the teeth 211 on the other foot plate 21 so as to rotate the foot plates 21 synchronously in opposite directions to extend outward from two sides of the case 22. In order to stabilize the case 22, the foot plates 21 must extend outward by a substantial distance from the case 22, thereby rendering the case 22 not suitable for placing within limited spaces.

SUMMARY OF THE INVENTION

The main object of the present invention is to provide a foot which is adapted for stabilizing a computer case and which is adjustable with respect to the angle and the position thereof so that the computer case can be positioned within a limited space.

Another object of the present invention is to provide a foot which can cover the bottom of the computer case when not in use.

According to this invention, a foot includes a circular mounting plate to be secured to the bottom of the case, and an elongate foot plate which has a longitudinal channel to receive the mounting plate. The foot plate is rotatable about the axis of the mounting plate, and the mounting plate is slidable along the foot plate. Therefore, the foot plate may be rotated and moved to project outwardly from the bottom of the case for accommodation in the space where the case is located.

BRIEF DESCRIPTION OF THE DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 3:
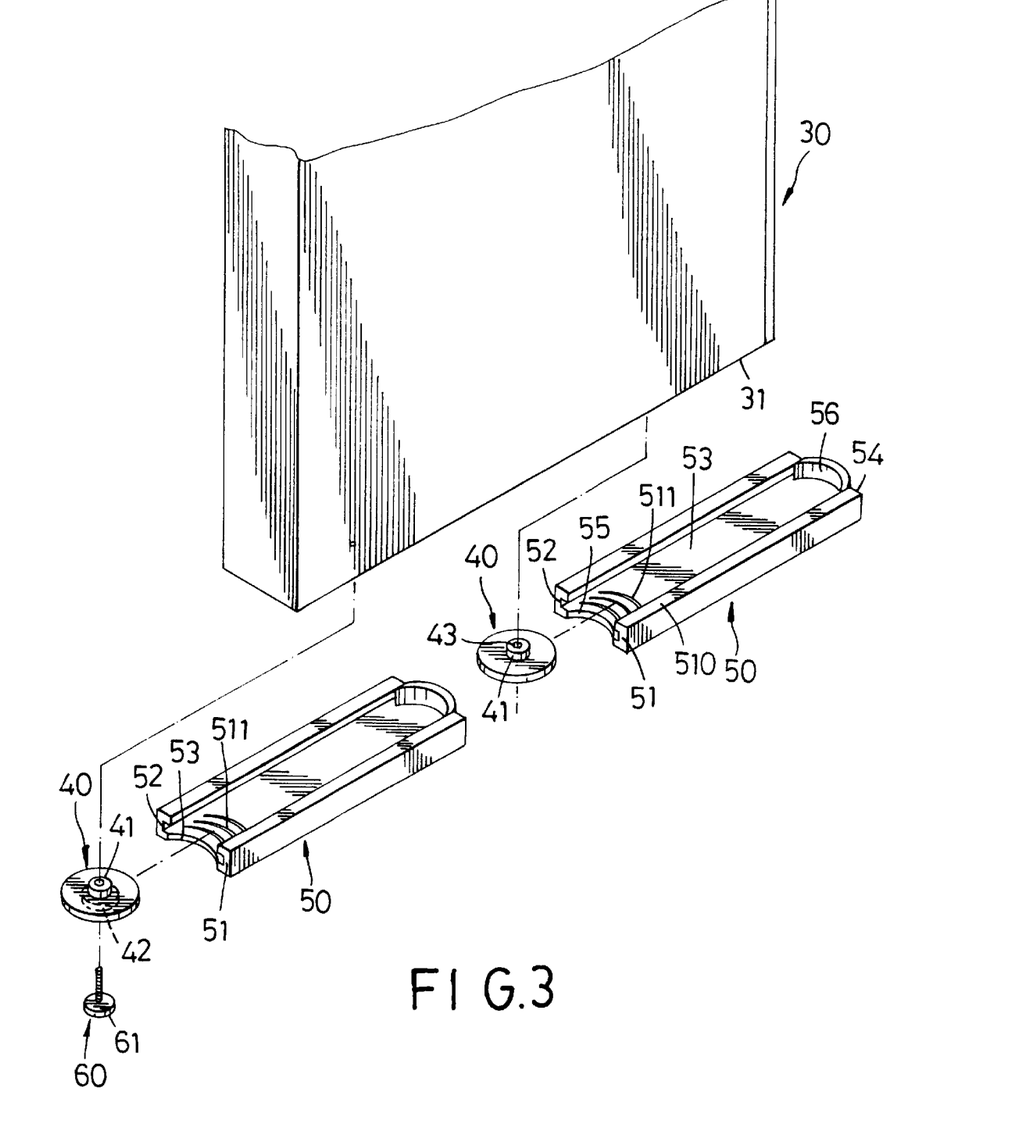
FIG. 3 is an exploded view of a preferred embodiment of a foot according to the present invention.
Figure 4:
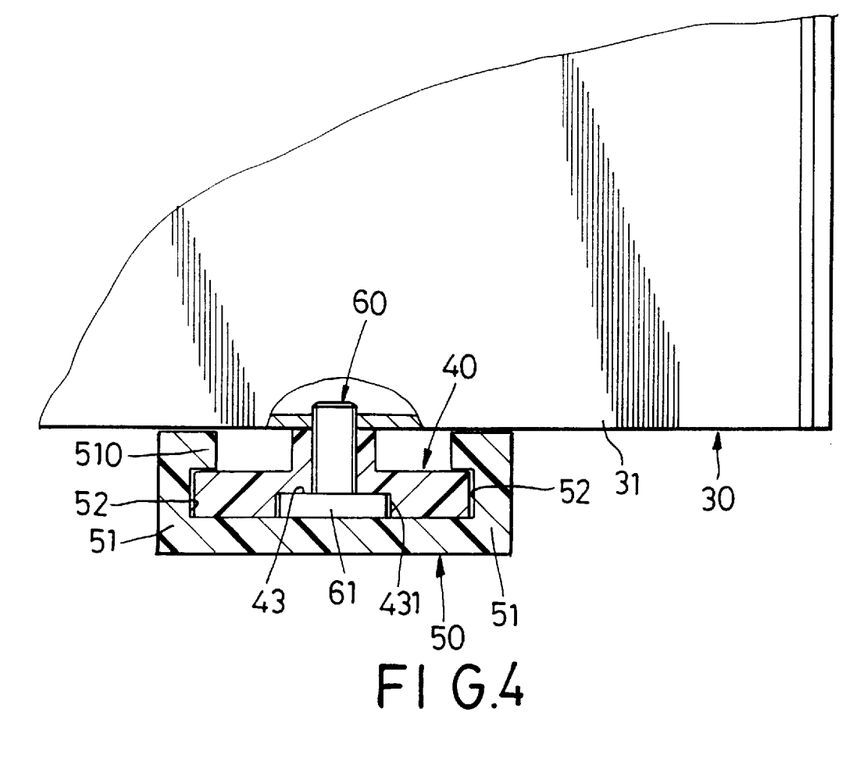
FIG. 4 is a sectional view showing the foot when mounted to a bottom of a computer case.

Referring to FIGS. 3 and 4, two feet which embody the present invention are shown to be mounted on a bottom of a computer case 30. Each foot comprises a circular mounting plate 40 and an elongate foot plate 50. The mounting plate 40 has an upper stem 41 which has a top wall that can abut against the bottom 31 of the computer case 30. A through hole 43 has a lower enlarged portion 431 and passes through the upper stem 41. A fastening bolt 60 is inserted into the through hole 43 and the bottom 31 of the computer case 30 such that a head 61 of the fastening bolt 60 is received within the lower enlarged portion 431. The foot plate 50 has two longitudinally and upwardly extending flanges 51 and two inwardly extending rims 510 on top ends of the extending flanges 51 so as to form two grooved rails 52. A channel 53 is defined by each foot plate 50 and the extending flanges 51 so as to receive the mounting plate 40. The foot plate 50 has a first end 54 which has a transverse and arcuate wall 56 to close the channel 53, and the channel 53 is open at a second end 55 of the foot plate 50. Each foot plate 50 has three transverse ribs 511 adjacent to the second end 55 to prevent the mounting plate 40 from slipping off from the channel 53.

In assembly, each mounting plate 40 is fastened to the bottom 31 of the computer case 30 by the fastening bolt 60. The foot plate 50 is attached to the mounting plate 40 so that the mounting plate 40 is received in the channel 53 and is retained therein by the grooved rails 52. Each foot plate 50 is slidable longitudinally along and is rotatable about the corresponding mounting plate 40. Since the foot plate 50 is secured to the bottom 31 of the computer case 30, the risk of losing the foot plate 50 can be eliminated.

Figure 5:
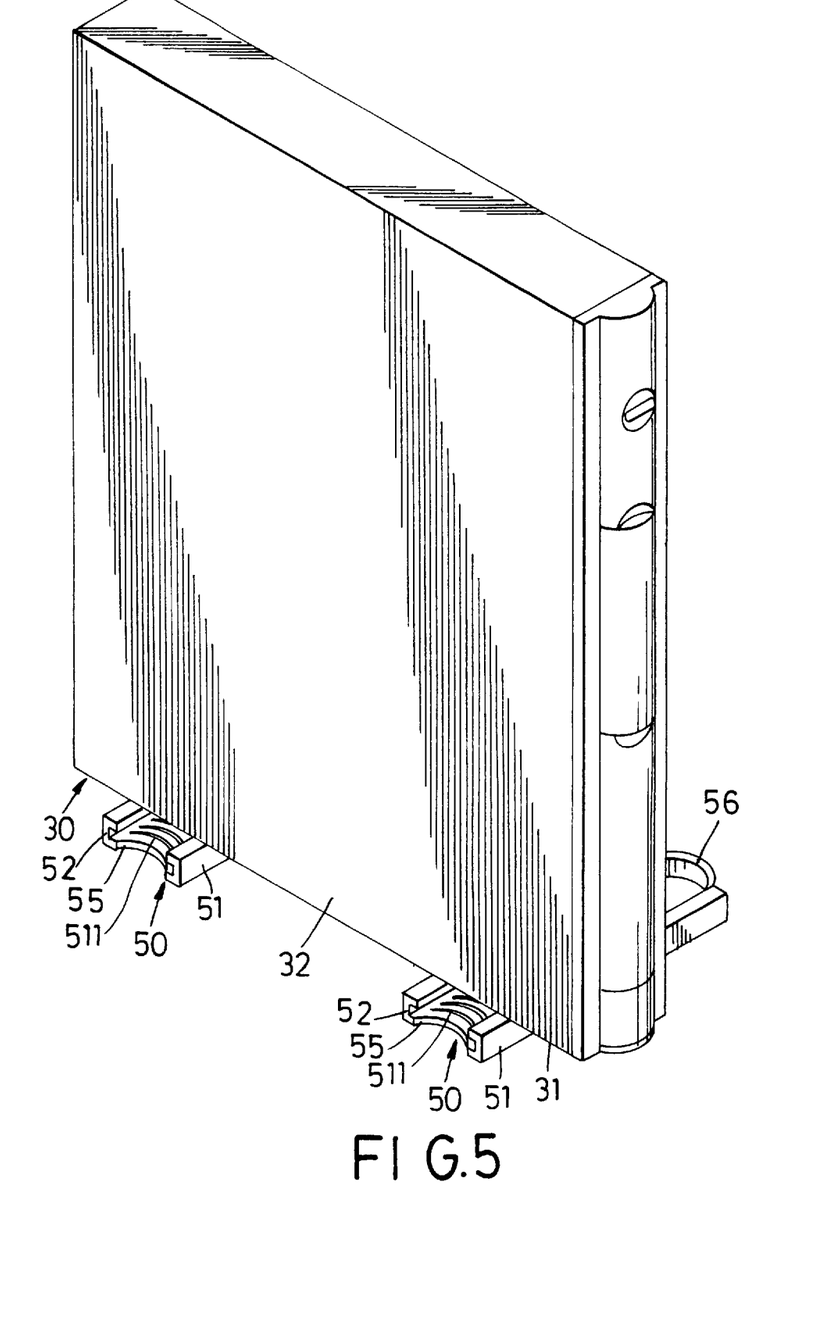
FIG. 5 is a perspective view showing the preferred embodiment in a first mode of use.
Figure 6:
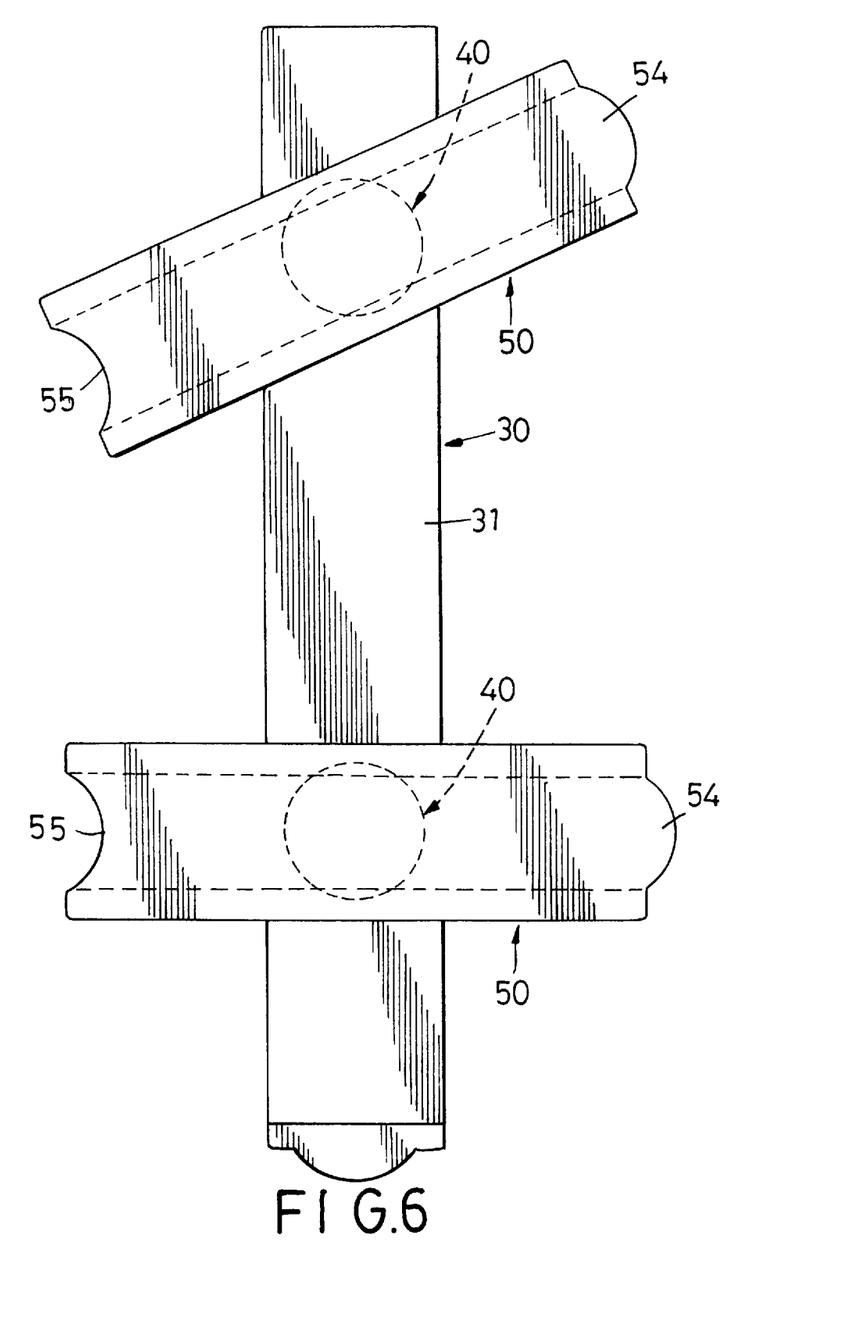
FIG. 6 is a schematic view showing the preferred embodiment in a second mode of use.
Figure 7:
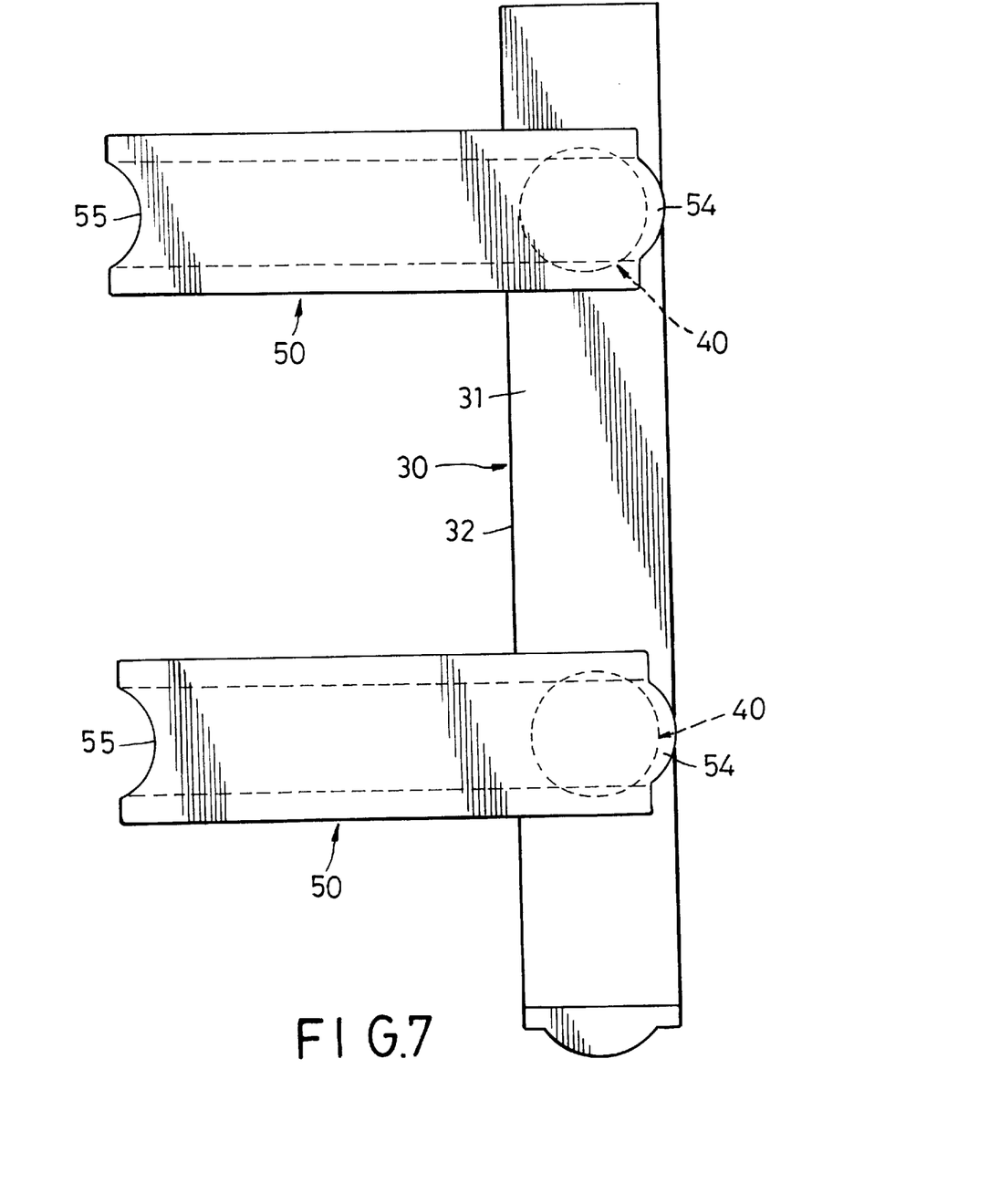
FIG. 7 is a schematic view showing the preferred embodiment in a third mode of use.
Figure 8:
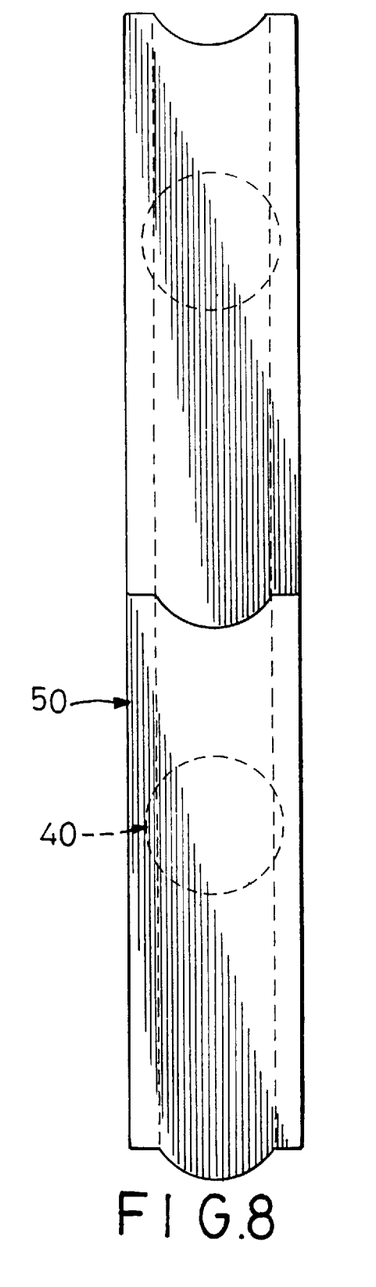
FIG. 8 is a schematic view showing the foot in a position for alignment with the bottom of the computer case.

Referring to FIG. 5, the foot plates 50 may be rotated and moved to project outwardly from the bottom 31 of the computer case 30 in a direction perpendicular to side walls 32 of the case 30. To permit accommodation on the space where the computer case 30 is located, the lengths of the foot plates 50 that project from the side walls 32, and the inclining angle of the foot plates 50 relative to the mounting plates 40 can be adjusted, as shown in FIG. 6. Referring to FIG. 7, when the mounting plates 40 abut the transverse and arcuate walls 56 of the foot plates 50, one side 32 of the computer case 30 and the foot plates 50 may be used as a book rack. When the computer case 30 is not in use or is positioned horizontally, the foot plates 50 can be rotated so as to be hidden under or covered completely by the bottom 31, as shown in FIG. 8.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A foot for a case, comprising:

a circular mounting plate having an upper stem adapted to be attached to a bottom of the case; and an elongate foot plate being rotatable about an axis of the mounting plate and having two longitudinally and upwardly extending flanges to confine a channel to receive the mounting plate, and two grooved rails formed in the flanges to retain the mounting plate slidably in the channel, the elongate foot plate including a first end and a second end which is opposite from the first end, the first end having a transverse and arcuate member to close the channel, the elongate foot plate having a plurality of transverse ribs adjacent to the second end, the channel being open at the second end.

* * * * *